United States Patent [19]

Williams

[11] 3,893,298

[45] July 8, 1975

[54] SINGLE-STROKE CARTRIDGE ACTUATED DEVICE

[75] Inventor: George B. Williams, Dahlgren, Va.

[73] Assignee: The United States of America as represented by the Secretary of the Navy, Washington, D.C.

[22] Filed: Mar. 25, 1974

[21] Appl. No.: 454,358

[52] U.S. Cl. ............... 60/635; 60/636; 60/637; 92/26
[51] Int. Cl.² ............... F01B 29/08; F02N 13/00
[58] Field of Search ........... 92/15, 26; 60/635, 636, 60/637, 638; 403/282

[56] References Cited
UNITED STATES PATENTS

| | | | |
|---|---|---|---|
| 1,481,089 | 1/1924 | Glaser | 92/15 X |
| 2,674,852 | 4/1954 | Olman | 60/635 X |
| 2,685,275 | 8/1954 | Caldwell | 92/26 X |
| 2,855,899 | 10/1958 | Beaty | 92/26 X |
| 2,903,849 | 9/1959 | Fawcett et al. | 60/637 X |
| 2,996,046 | 8/1961 | Skopp et al. | 92/26 X |
| 3,112,670 | 12/1963 | Litz, Jr. | 60/636 X |
| 3,173,257 | 3/1965 | Lucien | 92/15 X |
| 3,199,288 | 8/1965 | Nahas | 60/635 |
| 3,415,167 | 12/1968 | Champagne | 92/26 |
| 3,702,620 | 11/1972 | Howell et al. | 60/638 X |

Primary Examiner—Martin P. Schwadron
Assistant Examiner—Abraham Hershkovitz

[57] ABSTRACT

A non-return interference lock for the piston in a cartridge actuated device comprising a projection formed on the end of the piston and a conical expander located at the end of piston travel. The expander deforms or swages the projection into an interference position where it is engageable by a shoulder in the bore to prevent return of the piston.

4 Claims, 2 Drawing Figures

SINGLE-STROKE CARTRIDGE ACTUATED DEVICE

BACKGROUND OF THE INVENTION

1. Field of the Invention

This invention relates generally to single-stroke cartridge actuated devices and more particularly to a non-return interference lock for such devices.

2. Description of the Prior Art

Generally, existing methods involve wedging a tapered portion of a piston into a mating tapered hole at the end of the stroke or by allowing a compressed spring ring to travel with the piston and to spring open into a groove in the bore at a predetermined point in the stroke. The spring ring provides a desirable interference lock for a maximum pull out force requirement but the spring ring is difficult to install, causes friction drag during the stroke, can score the bore ahead of the piston O-ring seal, degrading the seal, and with a high velocity piston (i.e., cartridge actuated device) a potential exists for stroking past the bore groove without achieving lock out, which would preclude a reliable close tolerance stroke length.

Also, in U.S. Pat. No. 2,999,912 it was proposed that resilient contact arms engage a mating shoulder to provide lock-out, but the flexing of such members would preclude assurance that they would always engage. And in U.S. Pat. No. 3,111,808 a knife-edge on the thruster was proposed to preclude retrograde movement, but the deformation of the casting could easily prevent the knife-edge engagement which the patentee assumes. Further, in U.S. Pat. No. 3,234,727 a ring of deformable metal is forced into recesses in the piston and bore, but such soft metal would not permit the obtaining of maximum pull out force requirements.

SUMMARY OF THE INVENTION

The present invention provides a single-stroke cartridge actuated device in which the piston is provided, on the end opposite the piston rod, with a hollow cylindrical projection terminating in a flange of the same diameter as the piston. A conical expander is fixed in the base at the end of piston travel and deforms or swages the flange to a larger diameter. The flange is then engageable by a shoulder formed in the bore to provide positive lockout.

STATEMENT OF THE OBJECTS OF THE INVENTION

It is a primary object of this invention to provide a new and improved non-return interference lock for single-stroke cartridge actuated devices.

It is another object of this invention to provide a non-return interference lock for single-stroke devices which will meet high pull out force requirements.

It is a further object of this invention to provide a non-return lock for single-stroke devices with which close tolerance stroke lengths may be achieved.

DESCRIPTION OF THE PREFERRED EMBODIMENT

Figure 1:
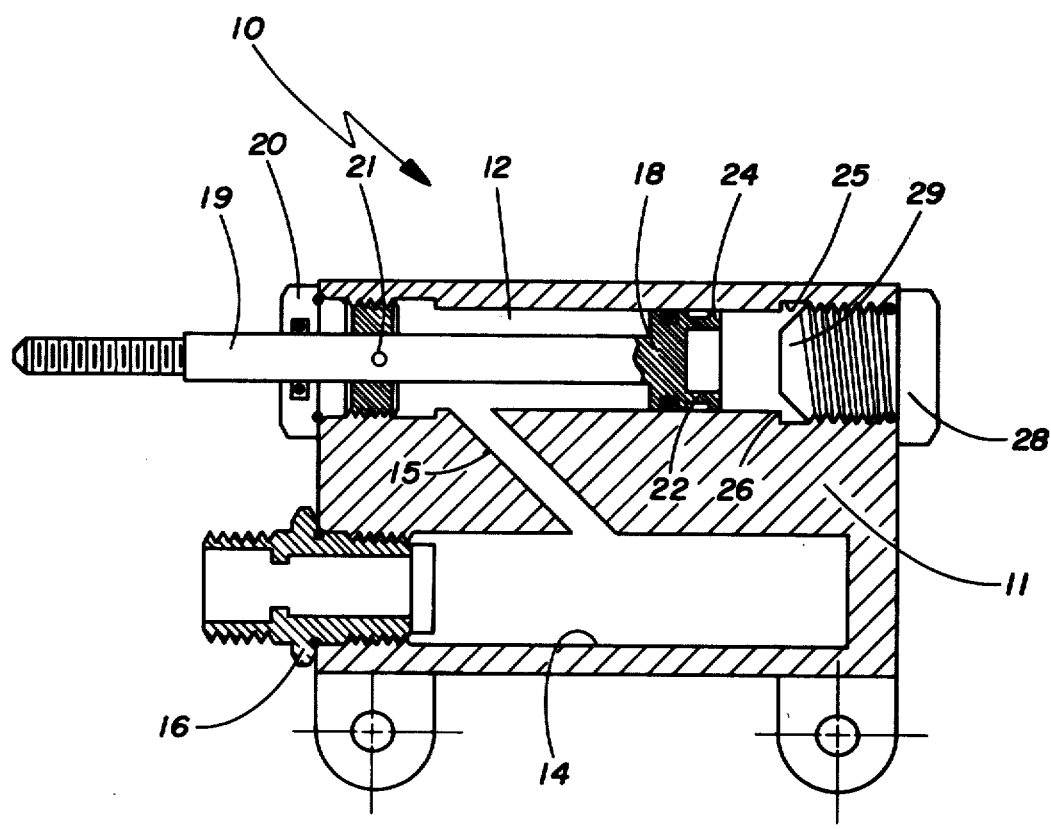
FIG. 1 is a sectional view of a single-stroke cartridge actuated device embodying the principal features of the present invention.

Attention now is directed to the drawings, and more particularly to FIG. 1, wherein there is illustrated a single-stroke cartridge actuated device, designated generally by the reference numeral 10, comprising a housing 11 provided with bore 12. A blind recess 14 is also provided in the housing and an interconnecting passage 15 serves to provide fluid communication between the bore 12 and the recess 14. A gas generating cartridge 16 is threaded into the open end of the recess 14.

A piston 18 and integral piston rod 19 is slidably disposed within the bore 12. A sealing plug 20 is threaded into one end of the bore 12 and is provided with a central aperture which encompasses the piston rod 19. A shear wire 21 through the housing 11 and piston rod 19 serves to prevent premature movement of the piston 18. A hollow cylindrical projection 22 is formed on the face of the piston 18 and is provided with a lock flange 24 of the same diameter as the piston.

The bore 12 is provided with a counterbored portion 25 of greater diameter to define a locking shoulder 26. A locking plug 28 is threaded into the counterbore 25 and is provided with a conical expander portion 29. O-ring seals are provided throughout as illustrated but will not be further described since their function to preserve gas tight integrity is obvious.

OPERATION

In order that a better understanding of the invention may be had, its mode of operation will now be described. To initiate operation of the device, the cartridge 16 is ignited by any convenient means. The gas generated by the cartridge expands into the recess 14 and into the bore 12 by means of the passage 15. The piston 18 is restrained from moving under the influence of the gas pressure until the shear wire 21 fails; at which time the piston begins moving to the right as viewed in FIG. 1. The free end of the piston rod 19 is of course fastened to whatever is to be actuated by the device.

Figure 2:
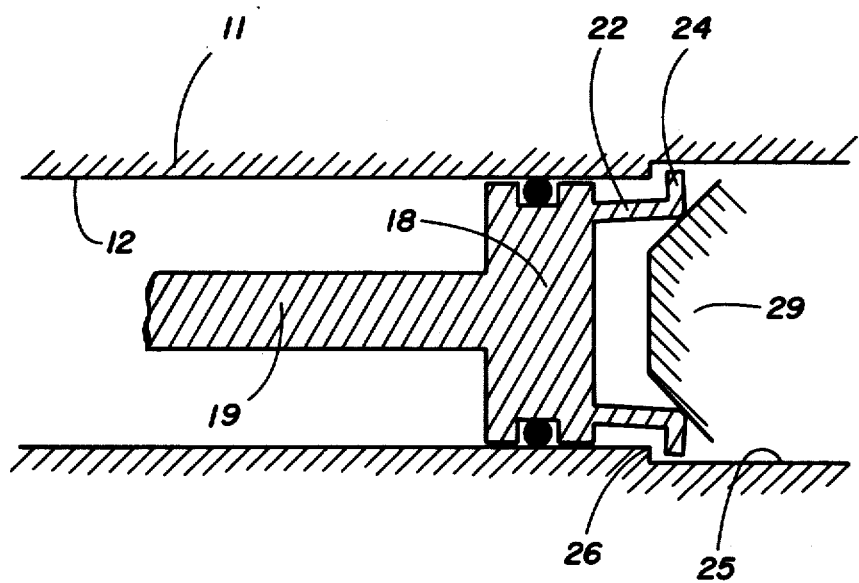
FIG. 2 is an enlarged fragmentary view of a portion of FIG. 1 and illustrating the action of the conical expander.

When the piston 18 nears the end of its travel, as best seen in FIG. 2, the cylindrical projection 22 moves into engagement with the conical expander 29 on the locking plug 28. The energy driving the piston is sufficient to force the projection 22 onto the expander 29 with sufficient force so that engagement of the inner edge of the flange 24 with the expander causes a permanent deformation of the flange 24 by swaging it beyond the elastic limit of the material of which the projection 22 and flange 24 are formed. With the flange 24 expanded as shown in FIG. 2, the piston 18 is precluded from retracting by engagement of the flange 24 by the shoulder 26.

From the foregoing it can be seen that the present invention possesses advantages not obtainable with prior art devices. The positive interference between the lock flange and the bore shoulder can meet high pull out force requirements. All features of the piston and conical expander are easily machined and no extra parts (e.g., spring rings) are required which could be inadvertently omitted during assembly. Also, no potential exists for stroking past the lock-out point and close tolerance stroke lengths are achieved.

Obviously many modifications and variations of the present invention are possible in the light of the above teachings. It is therefore to be understood that within the scope of the appended claims the invention may be practiced otherwise than as specifically described.

What is claimed is:

1. In a single-stroke, cartridge actuated device of the type having a piston which is axially movable within a cylindrical bore by virtue of gas generated by detonation of a cartridge, a non-return interference lock comprising:

a projection integrally formed on the forward end of said piston;

means fixed in the cylindrical bore opposite the forward end of said piston for deforming said projection beyond the yield point to an interference position when the piston reaches the end of its stroke; and means for engaging the deformed projection to preclude return of said piston.

2. A device as defined in claim 1 wherein said projection comprises a hollow cylindrical projection formed on the forward end of said piston and terminating in a locking flange having the same outside diameter as said piston.

3. A device as defined in claim 2 wherein said deforming means comprises a conical expander which swages the locking flange to a larger diameter using the energy driving said piston.

4. A device as defined in claim 3 wherein said engaging means comprises a counterbored section surrounding said conical expander and of greater diameter than the cylindrical bore to define therewith a locking shoulder which engages the expanded locking flange to preclude return of said piston.

* * * * *